US012621336B2

(12) United States Patent
Bosch et al.

(10) Patent No.: US 12,621,336 B2
(45) Date of Patent: May 5, 2026

(54) SYSTEMS AND METHODS FOR ADDRESSING INCONSISTENCIES IN ATTACK PATHS

(71) Applicant: Cisco Technology, Inc., San Jose, CA (US)

(72) Inventors: Hendrikus G. P. Bosch, Aalsmeer (NL); Jeffrey Michael Napper, Delft (NL); Andre Jean Marie Surcouf, Saint Leu la Foret (FR); Roee Yankelevsky, Haifa (IL)

(73) Assignee: Cisco Technology, Inc., San Jose, CA (US)

( * ) Notice: Subject to any disclaimer, the term of this patent is extended or adjusted under 35 U.S.C. 154(b) by 101 days.

(21) Appl. No.: 18/427,376

(22) Filed: Jan. 30, 2024

(65) Prior Publication Data

US 2025/0193222 A1      Jun. 12, 2025

Related U.S. Application Data

(60) Provisional application No. 63/608,420, filed on Dec. 11, 2023.

(51) Int. Cl.
H04L 9/40          (2022.01)
(52) U.S. Cl.
CPC ...... H04L 63/1433 (2013.01); H04L 63/1416 (2013.01)
(58) Field of Classification Search
None
See application file for complete search history.

(56) References Cited

U.S. PATENT DOCUMENTS

| | | | |
|---|---|---|---|
| 2016/0226893 A1 | 8/2016 | Warikoo et al. | |
| 2020/0356663 A1 | 11/2020 | Paturi et al. | |
| 2020/0389481 A1 | 12/2020 | Evans | |
| 2022/0108024 A1* | 4/2022 | Hamdi | ................ H04L 63/1483 |
| 2022/0210202 A1 | 6/2022 | Crabtree et al. | |
| 2023/0208870 A1* | 6/2023 | Yellapragada | .......... H04L 63/20 |
| | | | 726/22 |

FOREIGN PATENT DOCUMENTS

| | | | | |
|---|---|---|---|---|
| IN | 202311059750 A | 10/2023 | | |
| WO | WO-2023150065 A1 * | 8/2023 | ........... | G06F 21/577 |
| WO | WO-2024025863 A1 * | 2/2024 | ............. | G06Q 10/04 |

OTHER PUBLICATIONS

European Search Report for European Application No. 24214207.3, dated Jan. 14, 2025, 10 Pages.

* cited by examiner

*Primary Examiner* — William J. Goodchild
(74) *Attorney, Agent, or Firm* — Baker Botts L.L.P.

(57)          ABSTRACT

In one embodiment, a method includes receiving a plurality of records associated with a plurality of assets in a cloud system and one or more risks associated with one or more of the plurality of assets from one or more microservices, identifying one or more inconsistencies within the plurality of records, initiating a reconcile process to resolve the one or more inconsistencies, determining that a condition for an attack-path analysis is satisfied, and triggering the attack-path analysis to identify one or more attack paths.

20 Claims, 6 Drawing Sheets

100

500

SYSTEMS AND METHODS FOR ADDRESSING INCONSISTENCIES IN ATTACK PATHS

PRIORITY

This application claims the benefit under 35 U.S.C. § 119 (e) of U.S. Provisional Patent Application No. 63/608,420, filed 11 Dec. 2023, which is incorporated herein by reference.

TECHNICAL FIELD

The present disclosure relates generally to security in information systems, and more particularly, to addressing inconsistencies in attack paths.

BACKGROUND

A security solution may analyze an application that is being hosted on a cloud system to discover vulnerabilities, misconfigurations, and mishaps in that application, its cloud environment, the continuous integration and continuous delivery/continuous deployment (CI/CD) pipeline, and storage systems. Then, to understand what an attacker can do to that application, the security solution may find attack paths/kill chains to the application. The attack paths/kill chains represent steps attackers may take to steal central processing unit (CPU), create general mayhem in the application, and/or steal data. A cloud-native application protection platform (CNAPP) may be used to determine the attack paths. The CNAPP may need to present active attack paths in real-time or at least near real-time. If a customer deploys a container set with a series of critical vulnerabilities that enable hackers to get access to, for example, a set of credentials for the entire enterprise registry, that singular critical vulnerability has become a serious threat to the entire enterprise. Therefore, detecting the vulnerability in a timely manner would be highly important. However, presenting attack paths in real-time or near-real-time may be challenging because calculating attack paths is computationally and financially expensive.

DESCRIPTION OF EXAMPLE EMBODIMENTS

Overview

Figure 1:
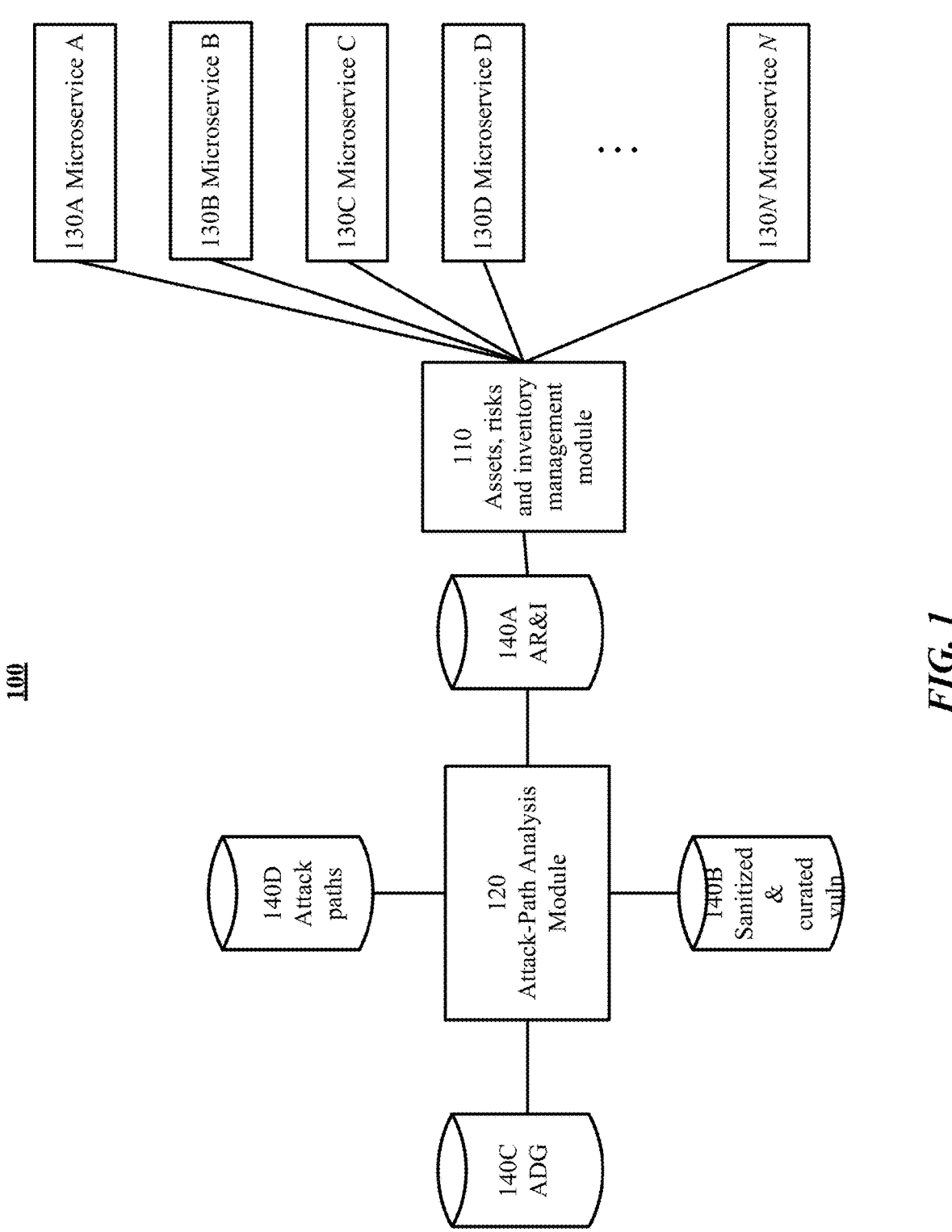
FIG. 1 illustrates an example logical architecture of a cloud management system for identifying attack paths in near-real-time.

In one or more embodiments, a method, by a cloud management system, may include receiving a plurality of records associated with a plurality of assets in a cloud system and one or more risks associated with one or more of the plurality of assets from one or more microservices. The method may include identifying one or more inconsistencies within the plurality of records. The method may include initiating a reconcile process to resolve the one or more inconsistencies. The method may include determining that a condition for an attack-path analysis is satisfied. The method may further include triggering the attack-path analysis to identify one or more attack paths.

In particular embodiments, a particular microservice of the one or more microservices may perform a scan of cloud resources corresponding to the particular microservice at a pre-determined interval. The particular microservice may report one or more records containing a result of the scan. In other embodiments, a particular microservice of the one or more microservice may detect an event associated with cloud resources corresponding to the particular microservice. The particular microservice may report one or more records associated with the event. In yet other embodiments, a particular microservice of the one or more microservice may perform a scan of cloud resources corresponding to the particular microservice based on a user input. The particular microservice may report one or more records containing a result of the scan. In particular embodiments, the cloud management system may store the plurality of records to a first database.

In particular embodiments, the plurality of records may include one or more timestamps. In particular embodiments, the one or more inconsistencies may include an inconsistency between a first record reported by a first microservice and a second record reported by a second microservice. A first timestamp associated with the first record may be older than a second timestamp associated with the second record. The reconcile process may include sending a request to the first microservice to update information of the first record and receiving a third record from the first microservice that contains updated information of the first record. In particular embodiments, the reconcile process may further include displaying a user interface indicating the inconsistency between the first record reported by the first microservice and the second record reported by the second microservice. In particular embodiments, the user interface may further indicate that the inconsistency between the first record and the second record is being resolved.

In particular embodiments, the reconcile process may include displaying a user interface indicating the one or more inconsistencies, receiving a user confirmation for resolving the one or more inconsistencies, sending requests to the one or more microservices to scan cloud resources upon receiving the user confirmation, and receiving a plurality of updated records associated with the plurality of assets in the cloud and one or more risks associated with one or more of the plurality of assets from the one or more microservices.

In particular embodiments, the condition for the attack-path analysis may include a timeout for an analysis scheduled at a pre-determined interval, an identification of one or more inconsistencies within the plurality of records, or a detection of changes in assets or in risks. In particular embodiments, the attack-path analysis may include identifying one or more vulnerabilities by processing the plurality of records associated with the plurality of assets and the one or more risks, constructing an asset dependency graph representing dependencies between the plurality of assets, and identifying one or more attack paths. In particular embodiments, the one or more vulnerabilities may be stored in a second database. In particular embodiments, the asset dependency graph may be maintained in a third database. In particular embodiments, the one or more identified attack paths may be maintained in a fourth database. In particular embodiments, the attack-path analysis may be performed based on information associated with previously known attack paths and their associated patterns. In particular embodiments, the attack-path analysis may be performed by a machine-learning model. In particular embodiments, the cloud management system may present the one or more identified attack paths to a user.

In particular embodiments, a cloud management system may include one or more processors, and one or more computer-readable non-transitory storage media coupled to one or more of the processors. The one or more computer-readable non-transitory storage media may include instructions operable when executed by one or more of the processors to receive a plurality of records associated with a plurality of assets in a cloud system and one or more risks associated with one or more of the plurality of assets from one or more microservices. The processors are further operable when executing the instructions to identify one or more inconsistencies within the plurality of records. The processors are further operable when executing the instructions to initiate a reconcile process to resolve the one or more inconsistencies. The processors are further operable when executing the instructions to determine that a condition for an attack-path analysis is satisfied. The processors are further operable when executing the instructions to trigger the attack-path analysis to identify one or more attack paths.

In one or more embodiments, one or more computer-readable non-transitory storage media may embody software that is operable, when executed by a cloud management system, to receive a plurality of records associated with a plurality of assets in a cloud system and one or more risks associated with one or more of the plurality of assets from one or more microservices. The software may be further operable when executed by the cloud management system to identify one or more inconsistencies within the plurality of records. The software may be further operable when executed by the cloud management system to initiate a reconcile process to resolve the one or more inconsistencies. The software may be further operable when executed by the cloud management system to determine that a condition for an attack-path analysis is satisfied. The software may be further operable when executed by the cloud management system to trigger the attack-path analysis to identify one or more attack paths.

Technical advantages of certain embodiments of this disclosure may include one or more of the following. This disclosure describes systems and methods for detecting an active attack path and presenting the detected attack path to a user in near-real-time. Certain systems and methods described herein may allow periodic attack path analyses. Certain systems and methods described herein may allow resolving potential inconsistent security view in near-real-time. Certain systems and methods described herein may allow triggering a partial attack path analysis.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and addressing inconsistencies in attack paths. A cloud management system may garner attack paths that are across a wide range of application functions, ranging from build-time risks to application run-time risks, and encompasses everything associated with the building, hosting, and running of the enterprise application. In other words, the cloud management system may assess all aspects of the application, from cloud to data, from CI/CD pipelines to active attacks. The cloud management system may present these risks through precalculated attack paths. An essence of security analysis of the cloud management system may be knowing context: understanding the reachability for attackers to certain vulnerabilities. Identifying a certain misconfiguration or vulnerability of a deployment may be important. However, knowing whether that misconfiguration or vulnerability is an actual risk may be more important. This calculation may be the key asset the cloud management system needs to strengthen when the cloud management system combines current (Cloud Security Posture Management (CSPM)-based) attack path and associated overall risk analysis with (potential) risks collected from other microservices. The cloud management system may present active attack paths in real-time or at least near real-time. If a customer deploys a container set with a series of critical vulnerabilities that enable hackers to get access to, for example, a set of credentials for the entire enterprise registry, that singular critical vulnerability has become a serious threat to the entire enterprise. Therefore, detecting the vulnerability in a timely manner would be highly important. Detecting a potential threat in real-time would be ideal. If that is not possible, the detection should be done as-soon-as-reasonably-possible. So, whenever new risks are detected, integrating the detected risks into attack paths quickly and enabling the customer to address the risk at their earlier convenience would be critical. Presenting attack paths in real-time or near-real-time may be challenging because calculating attack paths is computationally and financially expensive. Also, a consistent set of assets/risks need to be known to make it possible. In most cases, today, a cloud management system may periodically (e.g., once a day) obtain all cloud state for application assets by scanning for all cloud assets and execute a series of attack-path analyses, which are ultimately presented to customers in their daily summaries. Other security engines in the cloud management system framework, such as cloud-workload protection, cloud-detection and response, API security and code&build security, may work on a different time scale. The security engines may obtain risks whenever applications are built, deployed, and run, which may occur many times a day. The obtained risks may be reported to the asset and inventory database. Combining dynamic information with static (and potentially out-of-date) information may lead to confusing the users with inconsistent security information. Attack paths may not be strictly required to be created by a scan of cloud assets. In cases, attack-path reports start with just a scan from a workload-, API-, or code&build risk engine. Also in these cases, there are likely going to be temporal differences in the reporting of these. The cloud management system disclosed herein aims to reduce such inconsistencies to a minimum.

In particular embodiments, a cloud management system may receive a plurality of records associated with a plurality of assets in a cloud and one or more risks associated with one or more of the plurality of assets from one or more microservices. The cloud management system may be referred to as cloud-native application protection platform (CNAPP). In particular embodiments, the one or more microservices may be risk engines. In particular embodiments, a CNAPP disclosed herein may have an ability to pre-calculate, across an enterprise's application and cloud assets, attack paths. The CNAPP may calculate how attackers can subvert the application to do their bidding by first scanning all the enterprise's cloud resources for held assets and risks embedded by these assets, and then combining these with risks found in other enterprise application assets. The CNAPP may assess how attackers can steal resources such as central processing unit (CPU), and potentially in the future even graphics processing unit (GPU), disrupt the application or muck with data resources. The hacker's course of actions may be referred to as an attack path.

FIG. 1 illustrates an example logical architecture of a cloud management system 100 for identifying attack paths in near-real-time. Cloud management system 100 or portions thereof may be associated with an entity, which may include any entity, such as a business, company, or enterprise, that addresses inconsistencies in attack paths. The components of cloud management system 100 may include any suitable combination of hardware, firmware, and software. For example, the components of cloud management system 100 may use one or more elements of the computer system of FIG. 6. In the illustrated embodiment of FIG. 1, cloud management system 100 of FIG. 1 includes an assets, risks and inventory (AR&I) management module 110, an attack path analysis module 120, microservices 130, AR*I database 140A, sanitized and curated vulnerability database 140B, assets dependency graph database 140C, and attack path database 140D.

AR&I management module 110 of cloud management system 100 represents a software module managing assets, their associated risks, and inventory in the cloud system.

Attack-path analysis module 120 of cloud management system 100 represents a software module performing an attack-path analysis upon a condition for the analyses is satisfied.

Microservices 130A-130N of cloud management system 100 represents microservices that detects assets and their associated risks in corresponding cloud resources.

AR&I database 140A of cloud management system 100 represents a database maintaining records reported by the microservices 130A-130N. The records contain information regarding assets and their associated with risks.

Sanitized and curated vulnerability database 140B of cloud management system 100 represents a database maintaining vulnerabilities identified by the attack-path analysis module 120 during the attack-path analyses.

Assets dependency graph database 140C of cloud management system 100 represents a database maintaining assets dependency graph computed during the attack-path analyses performed by the attack-path analysis module 120.

Attack path database 140D of cloud management system 100 represents a database maintaining attack paths identified during the attack-path analyses performed by the attack-path analysis module 120.

Each of microservices A-N may correspond to particular cloud resources. Each microservice may report one or more records regarding assets and their associated risks withing the corresponding cloud resources. Assets, risks and inventory (AR&I) management module 110 may communicate with the microservices A-N and be responsible for managing an AR&I database 140A. The records reported by the microservices A-N may be stored in the AR&I database 140A. The AR&I management module 110 may also trigger an attack-path analysis module 120 to perform an attack-path analysis when a condition for the attack-path analysis is met. The attack-path analysis module 120 may access the AR&I database 140A, a sanitized-and-curated vulnerability database 140B, asset dependency graph database 140C, and attack-path database 140D for performing the attack-path analysis. Although this disclosure describes a particular logical architecture of a cloud management system 100 for identifying attack paths in near-real-time, this disclosure contemplates any suitable logical architecture of a cloud management system 100 for identifying attack paths in near-real-time.

In particular embodiments, a microservice may scan cloud resources corresponding to the microservice at a pre-determined interval. The microservice may report one or more records containing a result of the scanning. Streaming (pub/sub) and Open Application Programming Interface (OpenAPI) interfaces may be used for the report. Data format of messages may be harmonized on Open Cybersecurity Schema Framework (OCSF), the cyber-risk reporting function, with a managed (extensible) data format. Microservices only post messages to AR&I database 140A. The messages may include "first-seen" and/or "last-seen" time stamps and may be idempotent. Transmission times may be kept for reconciliation cases. As an example and not by way of limitation, the microservice A 130A may scan its corresponding cloud resources at every hour and report one or more records containing the result of the scan to the AR&I management module 110, which will store the received records to the AR&I database 140A. As another example and not by way of limitation, the microservice B 130B may scan its corresponding cloud resources at every 24 hours and report one or more records containing the result of the scan to the AR&I management module 110, which will store the received records to the AR&I database 140A. Thus, the frequencies of the reports from different microservices may be different from each other. Although this disclosure describes scanning cloud resources and reporting a result of the scanning at a pre-determined interval in a particular manner, this disclosure contemplates scanning cloud resources and reporting a result of the scanning at a pre-determined interval in any suitable manner.

In particular embodiments, a microservice may detect an event associated with cloud resources corresponding to the microservice. The microservice reports one or more records as a result of the detection. As an example and not by way of limitation, the microservice C 130C may detect that a new asset has been deployed to the cloud. The microservice C 130C may report one or more records containing the detection to the AR&I management module 110, which will store the received records to the AR&I database. In particular embodiments, the AR&I management module 110 may trigger the attack-path analysis module to perform a partial attack-path analysis regarding the newly deployed assets. Although this disclosure describes detecting an event associated with cloud resources and reporting one or more records containing the detection in a particular manner, this disclosure contemplates detecting an event associated with cloud resources and reporting one or more records containing the detection in any suitable manner.

In particular embodiments, a particular microservice of the one or more microservice may perform a scan of cloud resources corresponding to the particular microservice based on a user input. In particular embodiments, the user input may be received via a user interface. In particular embodiments, the user input may be received through an API. The particular microservice may report one or more records containing a result of the scan. The particular microservice may report one or more records containing a result of the scan. Streaming and OpenAPI interfaces may be used for the report. Although this disclosure describes performing a scan based on a user input in a particular manner, this disclosure contemplates performing a scan based on a user input in any suitable manner.

In particular embodiments, the AR&I management module 110 of the cloud management system 100 may identify one or more inconsistencies within the plurality of records. The AR&I management module 110 may initiate a reconcile process to resolve the identified one or more inconsistencies. Each of the plurality of records may include one or more timestamps. In particular embodiments, the one or more inconsistencies may include an inconsistency between a first record reported by a first microservice and a second record reported by a second microservice. A first timestamp associated with the first record may be older than a second timestamp associated with the second record. In such a case, the cloud management system 100, as the reconcile process, may send a request to the first microservice to update information of the first record. The cloud management system 100 may receive a third record from the first microservice that contains updated information of the first record. In particular embodiments, the cloud management system 100 may also display a user interface indicating the inconsistency between the first record reported by the first microservice and the second record reported by the second microservice. The user interface may further indicate that the inconsistency between the first record and the second record is being resolved.

Although FIG. 1 describes and illustrates an example an example logical architecture of a cloud management system 100 for identifying attack paths in near-real-time, this disclosure contemplates any suitable logical architecture of a cloud management system for identifying attack paths in near-real-time. Furthermore, although this disclosure describes and illustrates particular components, devices, or systems carrying out particular steps of FIG. 1, this disclosure contemplates any suitable combination of any suitable components, devices, or systems carrying out any suitable steps of FIG. 1.

Figure 2:
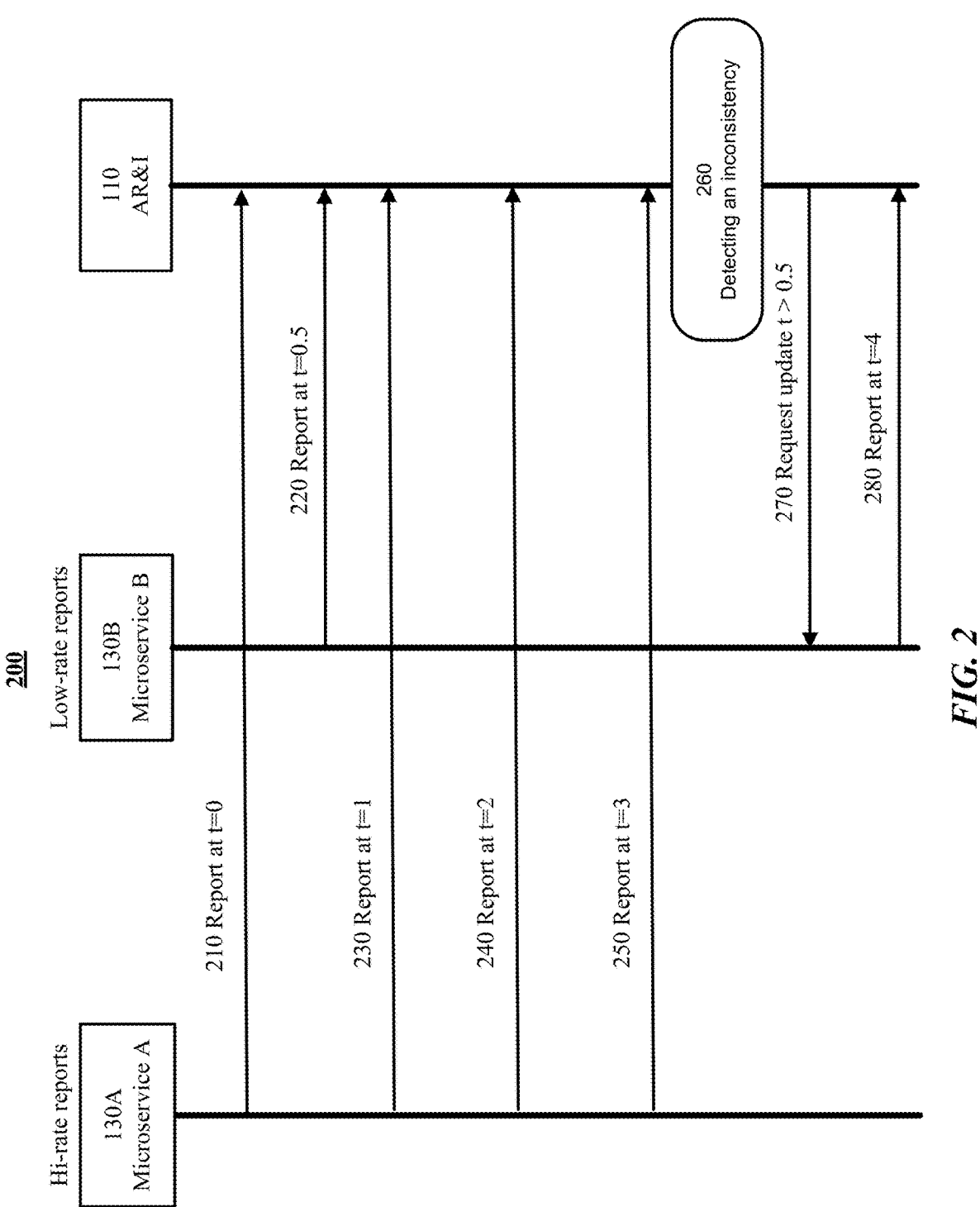
FIG. 2 illustrates an example reconcile process.

FIG. 2 illustrates an example reconcile process 200. As an example and not by way of limitation, as illustrated in FIG. 2, microservice A 130A and microservice B 130B may report records containing results of their scans to the AR&I management module 110. Microservice A 130A reports the results of its scans at higher rate than microservice B 130B. At step 210, microservice A 130A reports a result of its scan at time 0 to the AR&I management module 110. The AR&I management module 110 may store the report to the AR&I database 140A. At step 220, microservice B 130B reports a result of its scan at time 0.5 to the AR&I management module 110. The AR&I management module 110 may store the report to the AR&I database 140A. At step 230, microservice A 130A reports a result of its scan at time 1 to the AR&I management module 110. The AR&I management module 110 may store the report to the AR&I database 140A. At step 240, microservice A 130A reports a result of its scan at time 2 to the AR&I management module 110. The AR&I management module 110 may store the report to the AR&I database 140A. At step 250, microservice A 130A reports a result of its scan at time 3 to the AR&I management module 110. The AR&I management module 110 may store the report to the AR&I database 140A. At step 260, the AR&I management module 110 may detect that an inconsistency exists between the latest report from microservice A 130A and the report from microservice B 130B. At step 270, the AR&I management module 110 may request microservice B 130B to update the record since time 0.5. Upon receiving the request from the AR&I management module 110, microservice B may scan its corresponding cloud resources and report the result of the scan at step 280. In particular embodiments, the AR&I management module 110 may trigger the attack-path analysis module 120 to perform a partial attack-path analysis because changes are detected in the AR&I database 140A. Although this disclosure describes initiating a reconcile process to resolve an identified one or more inconsistencies in a particular manner, this disclosure contemplates initiating a reconcile process to resolve an identified one or more inconsistencies in any suitable manner.

In particular embodiments, an automated reconcile process may not be possible due to various reasons including technical issues, policies, or any suitable reason. In such a scenario, the cloud management system 100 of FIG. 1, as the reconcile process, may display a user interface indicating the one or more inconsistencies. The cloud management system 100 may receive a user confirmation for resolving the one or more inconsistencies. Upon receiving the user confirmation, the cloud management system 100 may send requests to one or more microservices to rescan cloud resources. The cloud management system 100 may receive a plurality of updated records associated with the plurality of assets in the cloud and one or more risks associated with one or more of the plurality of assets from the one or more microservices.

Although FIG. 2 describes and illustrates an example reconcile process 200, this disclosure contemplates any suitable reconcile process. Furthermore, although this disclosure describes and illustrates particular components, devices, or systems carrying out particular steps of the example reconcile process 200 of FIG. 2, this disclosure contemplates any suitable combination of any suitable components, devices, or systems carrying out any suitable steps of the process of FIG. 2.

Figure 3:
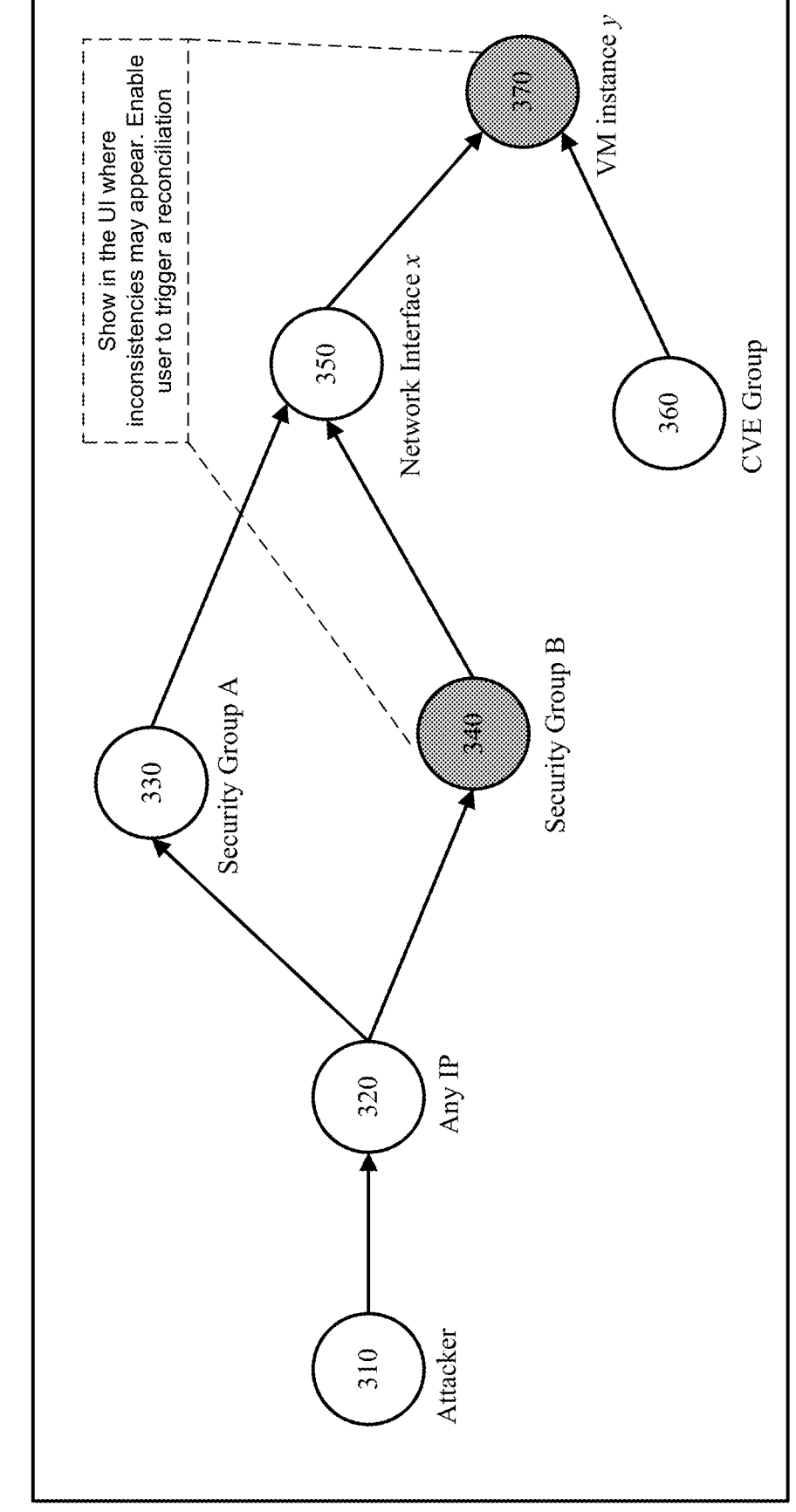
FIG. 3 illustrates an example user interface indicating one or more inconsistencies.

FIG. 3 illustrates an example user interface 300 indicating one or more inconsistencies. User interface 300 represents a point of interaction between a user and a design. User interface 300 may be a graphical user interface (GUI), an interface controlled through voice, an interactive interface that uses gestures, or any other suitable type of interface. User interface 300 of FIG. 3 includes an attacker 310, any IP 320, a security group A 330, a security group B 340, a network interface x 350, a Common Vulnerabilities and Exposures (CVE) group 360, and a virtual machine instance y 370.

As an example and not by way of limitation, as illustrated in FIG. 3, the AR&I management module 110 of FIG. 1 may detect a number of inconsistencies. But the AR&I management module 110 may not be able to initiate an automated reconcile process due to one or more reasons. The AR&I management module 110, as a part of a reconcile module, may present a user interface 300 indicating the detected number of inconsistencies. In the example illustrated in FIG. 3, security group B and virtual machine instance y are associated with inconsistencies. The user interface 300 may also have a way for the user to authorize a reconcile process. Upon receiving the authorization from the user, the AR&I management module 110 may cause one or more microservice to re-scan cloud resources and report the results of the re-scans. In particular embodiments, the AR&I management module 110 may cause all microservice in the cloud system to re-scan the cloud resources. In particular embodiments, the AR&I management module 110 may cause only microservices associated with the detected inconsistencies to re-scan their corresponding cloud resources. Although this disclosure describes getting user input for a reconcile process in a particular manner, this disclosure contemplates getting user input for a reconcile process in any suitable manner.

In particular embodiments, the cloud management system may determine that a condition for an attack-path analysis is satisfied. The condition for the attack-path analysis may include a timeout for an analysis scheduled at a pre-determined interval, an identification of one or more inconsistencies within the plurality of records, or a detection of changes in assets or in risks. As an example and not by way of limitation, the cloud management system may perform a regular attack-path analysis at every 24 hours. The attack-path analysis module 120 may access up-to-date information associated with assets and their risks from the AR&I database 140A. The attack-path analysis module 120 may perform a full attack-path analysis using the up-to-date information. In particular embodiments, the cloud management system may trigger all microservices 140A-140N to scan their corresponding cloud resources before the scheduled attack-path analysis. As another example and not by way of limitation, the cloud management system may detect one or more changes in assets or their risks. The cloud management system may trigger the attack-path analysis module 120 to perform an attack-path analysis. In particular embodiments, the AR &I management module 110 may detect the one or more changes in assets or their risks and trigger the attack-path analysis module 120 to perform the attack-path analysis. In particular embodiments, the attack-path analysis upon detecting changes in assets or their associated risks may be a partial analysis involving only the detected changes. In particular embodiments, the AR&I management module 110 may trigger the attack-path analysis module 120 to perform a partial attack-path analysis after performing a reconcile process when the AR&I management module 110 detects one or more inconsistencies. Although this disclosure describes triggering an attack-path analysis upon determining that a condition for the attack-path analysis is satisfied in a particular manner, this disclosure contemplates triggering an attack-path analysis upon determining that a condition for the attack-path analysis is satisfied in any suitable manner.

In particular embodiments, the cloud management system may trigger the attack-path analysis to identify one or more attack paths. The attack-path analysis module 120 within the cloud management system may identify one or more vulnerabilities by updating, enriching, sanitizing and correlating the plurality of records associated with the plurality of assets and the one or more risks. The one or more identified vulnerabilities may be stored in the sanitized and curated vulnerability database 140B. The attack-path analysis module may construct an asset dependency graph representing dependencies between the plurality of assets. The asset dependency graph may be maintained in the asset dependency graph database 140C. The attack-path analysis module may identify one or more attack paths. The one or more identified attack paths may be maintained in the attack path database 140D. The attack-path analysis may be performed based on information associated with previously known attack paths and their associated patterns. In particular embodiments, the attack-path analysis may be performed by a machine-learning model. The machine-learning model may be a classifier identifying one or more attack paths by comparing information patterns of the assets and their associated risks with information patterns of previously known attack paths. Once the attack-path analysis completes, the cloud management system may present the one or more identified attack paths to a user.

Although FIG. 3 describes and illustrates an example user interface 300 indicating one or more inconsistencies, this disclosure contemplates any suitable user interface indicating one or more inconsistencies. Furthermore, although this disclosure describes and illustrates particular components, devices, or systems carrying out particular steps of FIG. 3, this disclosure contemplates any suitable combination of any suitable components, devices, or systems carrying out any suitable steps of the method of FIG. 3.

Figure 4:
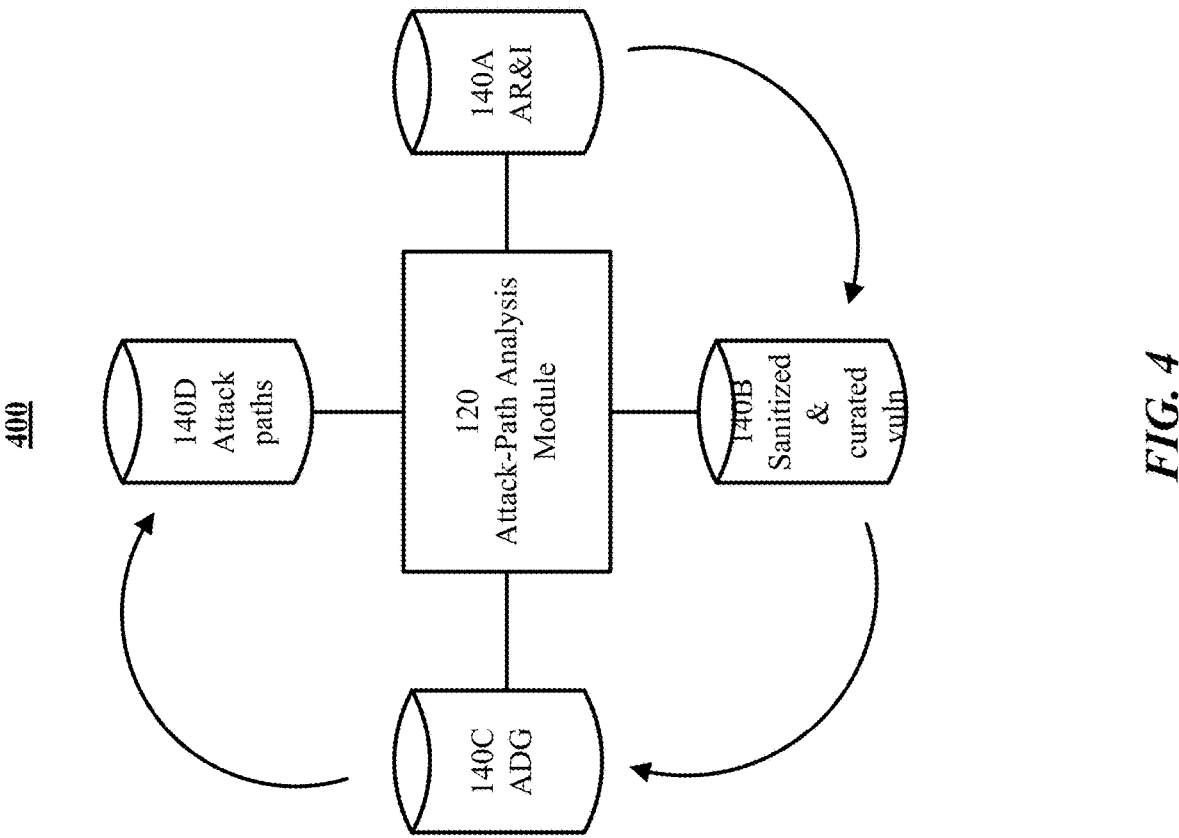
FIG. 4 illustrates an example process flow of an attack-path analysis.

FIG. 4 illustrates an example process flow 400 of an attack-path analysis. The attack-path analysis module 120 may access up-to-date information regarding assets and their associated risks in the cloud system from the AR&I database 140A. The attack-path analysis module 120 may update, enrich, sanitize and correlate the up-to-date information to identify one or more vulnerabilities. The one or more identified vulnerabilities may be stored in the sanitized and curated vulnerability database 140B. The attack-path analysis module may construct an asset dependency graph representing dependencies between the plurality of assets based on the up-to-date information from the AR&I database 140A and/or the one or more identified vulnerabilities stored in the sanitized and curated vulnerability database 140B. The asset dependency graph may be maintained in the asset dependency graph database 140C. The attack-path analysis module may identify one or more attack paths based on the data from the AR&I database 140A, the sanitized and curated vulnerability database 140B, or the asset dependency graph database 140C. The one or more identified attack paths may be maintained in the attack path database 140D. Although this disclosure describes performing an attack-path analysis in a particular manner, this disclosure contemplates performing an attack-path analysis in any suitable manner.

Although FIG. 4 describes and illustrates an example process flow 400 of an attack-path analysis, this disclosure contemplates any suitable example process flow 400 of an attack-path analysis. Furthermore, although this disclosure describes and illustrates particular components, devices, or systems carrying out particular steps of the example process flow 400 of FIG. 4, this disclosure contemplates any suitable combination of any suitable components, devices, or systems carrying out any suitable steps of the method of FIG. 4.

Figure 5:
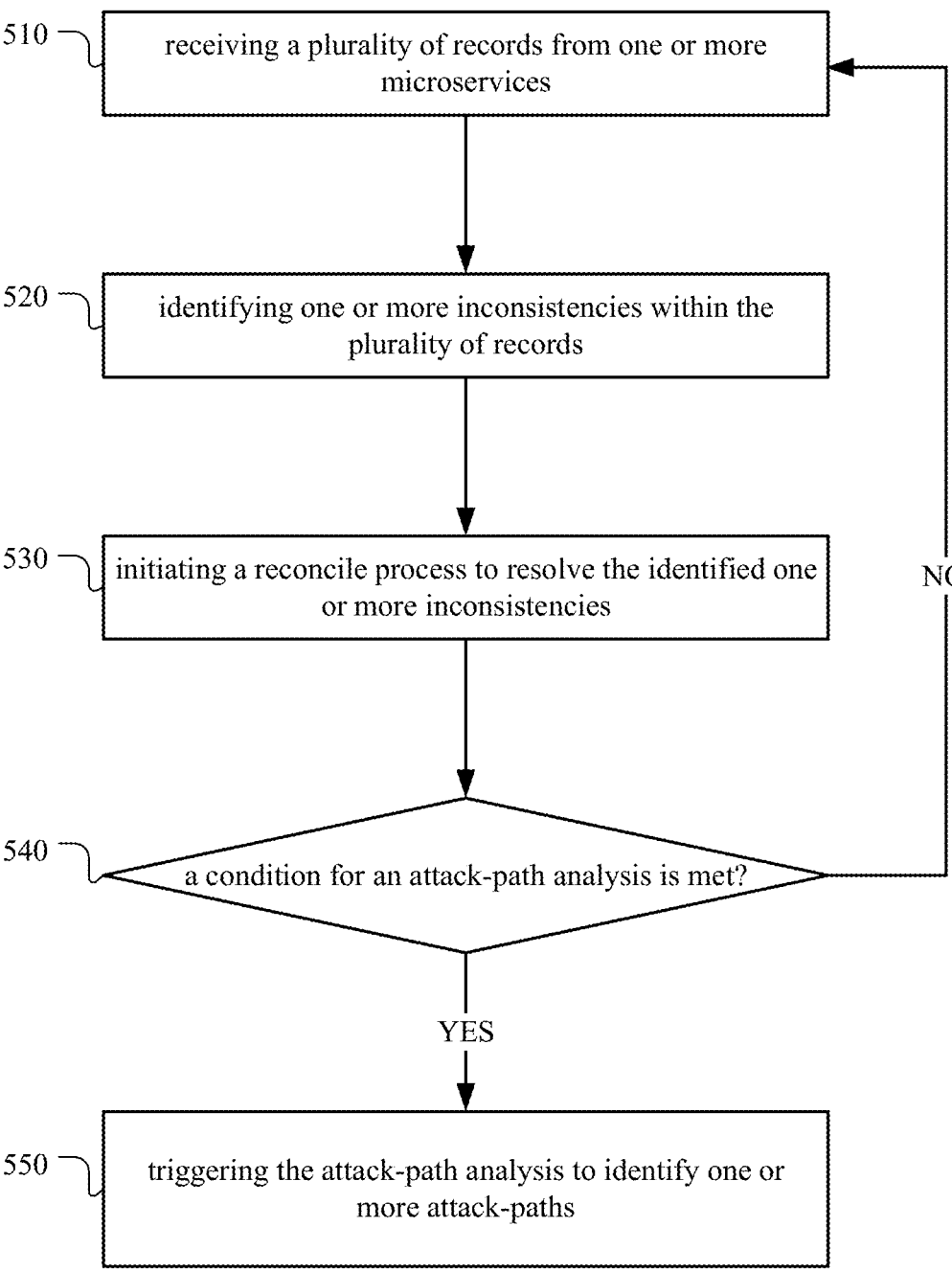
FIG. 5 illustrates an example method for identifying one or more attack paths within a cloud system in near-real-time.

FIG. 5 illustrates an example method 500 for identifying one or more attack paths within a cloud system in near-real-time. The method may begin at step 510, where a cloud management system may receive a plurality of records from one or more microservices associated with a plurality of assets in a cloud system and one or more risks associated with one or more of the plurality of assets. At step 520, the cloud management system may identify one or more inconsistencies within the plurality of records. At step 530, the cloud management system may initiate a reconcile process to resolve the identified one or more inconsistencies. At step 540, the cloud management system may determine whether a condition for an attack-path analysis is satisfied. When the cloud management system determines that the condition is satisfied, the method proceeds to step 550, where the cloud management system may trigger the attack-path analysis to identify one or more attack paths.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for identifying one or more attack paths within a cloud system in near-real-time of the method of FIG. 5, this disclosure contemplates any suitable method for identifying one or more attack paths within a cloud system in near-real-time including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
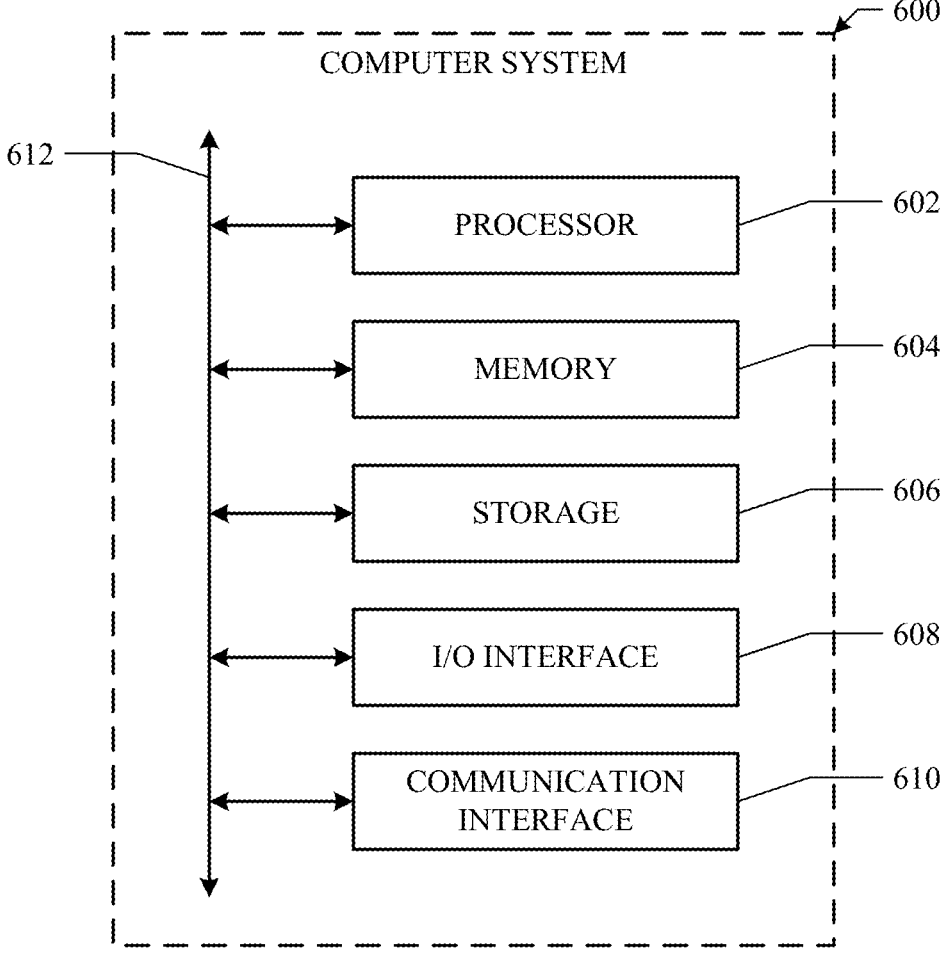
FIG. 6 illustrates an example computing system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate.

Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a cloud management system: receiving, from one or more microservices of the cloud management system, a plurality of records associated with a plurality of assets in a cloud system and one or more risks associated with one or more of the plurality of assets, wherein each of the one or more microservices of the cloud management system is configured to detect assets and their associated risks in corresponding cloud resources;

identifying one or more inconsistencies within the plurality of records;

initiating a reconcile process to resolve the one or more inconsistencies;

determining that a condition for an attack-path analysis is satisfied; and triggering the attack-path analysis to identify one or more attack paths.

2. The method of claim 1, wherein a particular microservice of the one or more microservices performs a scan of cloud resources corresponding to the particular microservice at a pre-determined interval, and wherein the particular microservice reports one or more records containing a result of the scan.

3. The method of claim 1, wherein a particular microservice of the one or more microservice detects an event associated with cloud resources corresponding to the particular microservice, and wherein the particular microservice reports one or more records associated with the event.

4. The method of claim 1, wherein a particular microservice of the one or more microservice performs a scan of cloud resources corresponding to the particular microservice based on a user input.

5. The method of claim 1, further comprising: storing the plurality of records to a first database.

6. The method of claim 1, wherein each of the plurality of records includes one or more timestamps.

7. The method of claim 6, wherein:

the one or more inconsistencies include an inconsistency between a first record reported by a first microservice and a second record reported by a second microservice;

a first timestamp associated with the first record is older than a second timestamp associated with the second record; and the reconcile process includes:

sending, to the first microservice, a request to update information of the first record; and receiving, from the first microservice, a third record that contains updated information of the first record.

8. The method of claim 7, wherein:

the reconcile process further includes displaying a user interface indicating the inconsistency between the first record reported by the first microservice and the second record reported by the second microservice; and the user interface further indicates that the inconsistency between the first record and the second record is being resolved.

9. The method of claim 1, wherein the reconcile process includes:

displaying a user interface indicating the one or more inconsistencies;

receiving a user confirmation for resolving the one or more inconsistencies;

sending, upon receiving the user confirmation, to the one or more microservices, requests to scan cloud resources; and receiving, from the one or more microservices, a plurality of updated records associated with the plurality of assets in the cloud and one or more risks associated with one or more of the plurality of assets.

10. The method of claim 1, wherein the condition for the attack-path analysis includes a timeout for an analysis scheduled at a pre-determined interval, an identification of one or more inconsistencies within the plurality of records, or a detection of changes in assets or in risks.

11. The method of claim 1, wherein the attack-path analysis comprises:

identifying one or more vulnerabilities by processing the plurality of records associated with the plurality of assets and the one or more risks;

constructing an asset dependency graph representing dependencies between the plurality of assets; and identifying one or more attack paths.

12. The method of claim 11, wherein:

the one or more vulnerabilities are stored in a second database;

the asset dependency graph is maintained in a third database; and the one or more identified attack paths are maintained in a fourth database.

13. The method of claim 1, wherein the attack-path analysis is performed based on information associated with previously known attack paths and their associated patterns.

14. The method of claim 1, wherein the attack-path analysis is performed by a machine-learning model.

15. The method of claim 1, further comprising:

presenting the one or more identified attack paths to a user.

16. A cloud management system comprising:

one or more processors; and one or more computer-readable non-transitory storage media coupled to one or more of the processors and comprising instructions operable when executed by one or more of the processors to:

receive, from one or more microservices of the cloud management system, a plurality of records associated with a plurality of assets in a cloud system and one or more risks associated with one or more of the plurality of assets, wherein each of the one or more microservices of the cloud management system is configured to detect assets and their associated risks in corresponding cloud resources;

identify one or more inconsistencies within the plurality of records;

initiate a reconcile process to resolve the one or more inconsistencies;

determine that a condition for an attack-path analysis is satisfied; and trigger the attack-path analysis to identify one or more attack paths.

17. The cloud management system of claim 16, wherein a particular microservice of the one or more microservices performs a scan of cloud resources corresponding to the particular microservice at a pre-determined interval, and wherein the particular microservice reports one or more records containing a result of the scan.

18. The cloud management system of claim 16, wherein a particular microservice of the one or more microservice detects an event associated with cloud resources corresponding to the particular microservice, and wherein the particular microservice reports one or more records associated with the event.

19. The cloud management system of claim 16, wherein a particular microservice of the one or more microservice performs a scan of cloud resources corresponding to the particular microservice based on a user input.

20. One or more computer-readable non-transitory storage media embodying software that is operable when executed by a cloud management system to:

receive, from one or more microservices of the cloud management system, a plurality of records associated with a plurality of assets in a cloud system and one or more risks associated with one or more of the plurality of assets, wherein each of the one or more microservices of the cloud management system is configured to detect assets and their associated risks in corresponding cloud resources;

identify one or more inconsistencies within the plurality of records;

initiate a reconcile process to resolve the one or more inconsistencies;

determine that a condition for an attack-path analysis is satisfied; and trigger the attack-path analysis to identify one or more attack paths.

* * * * *